United States Patent
Baruch et al.

(10) Patent No.: US 11,486,427 B2
(45) Date of Patent: Nov. 1, 2022

(54) STACKING LATCH MECHANISM

(71) Applicant: The Stanley Works Israel Ltd., Rosh Ha'Ayin (IL)

(72) Inventors: Danny Baruch, Lapid (IL); Lev Adin, Rehovot (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 525 days.

(21) Appl. No.: 16/514,589

(22) Filed: Jul. 17, 2019

(65) Prior Publication Data

US 2020/0025229 A1   Jan. 23, 2020

Related U.S. Application Data

(60) Provisional application No. 62/699,903, filed on Jul. 18, 2018.

(51) Int. Cl.
*F16B 5/06* (2006.01)
*B25H 3/02* (2006.01)

(52) U.S. Cl.
CPC .......... *F16B 5/0635* (2013.01); *B25H 3/021* (2013.01); *Y10T 403/608* (2015.01)

(58) Field of Classification Search
CPC ... B23H 3/021; F16B 5/0635; Y01T 403/608; B65D 21/0228; B65D 21/0217; B65D 21/0224; B65D 21/0219; B65D 2251/1058
USPC ........................ 403/322.4; 206/503, 508, 505
See application file for complete search history.

(56) References Cited

U.S. PATENT DOCUMENTS

| | | | | |
|---|---|---|---|---|
| 4,893,724 A | * | 1/1990 | Schiemann | .......... B65D 47/088 220/815 |
| 5,011,013 A | | 4/1991 | Meisner | |
| 5,199,592 A | * | 4/1993 | Reiland | ............. B65D 11/1833 220/817 |
| 8,567,796 B2 | * | 10/2013 | Bar-Erez | ................... B62B 1/04 280/47.26 |
| 8,944,537 B1 | | 2/2015 | Mamalang | |
| 9,193,060 B2 | * | 11/2015 | Ben-Gigi | ............... B25H 3/021 |

(Continued)

FOREIGN PATENT DOCUMENTS

| | | | |
|---|---|---|---|
| DE | 102015013053 A1 | 4/2017 | |
| DE | 102016112853 A1 * | 1/2018 | ............... B25H 3/02 |
| EP | 2436492 A2 | 4/2012 | |

OTHER PUBLICATIONS

EP Search Report excerpt dated, Dec. 18, 2019 in corresponding application No. 19187070.8.

*Primary Examiner* — Anthony D Stashick
*Assistant Examiner* — Prince Pal
(74) *Attorney, Agent, or Firm* — Bruce S. Shapiro

(57) ABSTRACT

The present invention relates to a latch mechanism configured to secure two bodies together by simply placing one body on top of the other and applying moderate downward pressure to the top body. The latch mechanism includes a housing and a latch partially disposed within the housing. The latch includes a main body, and a primary hook and an opposing secondary hook both extending from the main body. The latch is configured to be rotatable between a first position and a second position. In the first position, the primary hook is not obscured by the housing. In the second position, the primary hook is substantially obscured by the housing. The latch mechanism also includes a bias configured to bias the latch toward its first position.

20 Claims, 19 Drawing Sheets

(56) References Cited

U.S. PATENT DOCUMENTS

| | | | |
|---|---|---|---|
| RE47,022 E * | 9/2018 | Sosnovsky | B65D 45/22 |
| 11,155,382 B1 * | 10/2021 | Cai | B65D 21/0223 |
| 2003/0147691 A1 * | 8/2003 | Ho | B62J 7/08 |
| | | | 403/322.1 |
| 2007/0222231 A1 * | 9/2007 | Vilkomirski | E05C 3/14 |
| | | | 292/226 |
| 2009/0263187 A1 * | 10/2009 | Lee | B25C 5/1665 |
| | | | 403/330 |
| 2010/0320108 A1 | 12/2010 | Riedel | |
| 2011/0139666 A1 * | 6/2011 | Sosnovsky | B65D 45/22 |
| | | | 206/508 |
| 2012/0024739 A1 * | 2/2012 | Fjelland | F16B 45/02 |
| | | | 403/321 |
| 2017/0121056 A1 * | 5/2017 | Wang | B65D 21/0228 |
| 2019/0168376 A1 * | 6/2019 | Brocket | B25H 3/003 |
| 2021/0155373 A1 * | 5/2021 | Cai | B65D 21/0212 |
| 2021/0221561 A1 * | 7/2021 | Davidian | B65D 43/163 |
| 2021/0291954 A1 * | 9/2021 | Antoine | B64C 1/14 |

* cited by examiner

STACKING LATCH MECHANISM

FIELD OF THE INVENTION

The present application relates to a stacking latch mechanism.

BACKGROUND OF THE INVENTION

Carpenters and handy persons often need to carry multiple containers/stackable bodies to a jobsite. These containers/stackable bodies are often latched to one another. Typical latches are manual connectors that include a swinging portion having a hook on a first body and a protruding portion suitable for engaging the hook on the second body. These manual connectors require an operator to actively move the swinging portion into engagement with the protruding portion. This manual movement may not always be convenient. It would be good to have a stacking latch mechanism that automatically secures two bodies together by simply placing one body on top of another. Such a stacking latch mechanism would secure the two bodies together without an operator needing to physically move any parts of the latch.

The present invention overcomes one or more of the drawbacks discussed above.

BRIEF SUMMARY OF THE INVENTION

The present invention relates to a latch mechanism configured to secure two bodies together by simply placing one body on top of the other and applying moderate downward pressure to the top body. Alternatively, the weight of the upper body would supply enough downward force to engage the latch mechanism and secure the two bodies together. The latch mechanism includes a housing and a latch partially disposed within the housing. The latch includes a main body, and a primary hook and an opposing secondary hook both extending from the main body. The latch is configured to be rotatable between a first position and a second position. In the first position, the primary hook is not obscured by the housing. In the second position, the primary hook is substantially obscured by the housing. The latch mechanism also includes a bias configured to bias the latch toward its first position.

In another embodiment, the housing of the latch mechanism may also be a lid of a container.

In yet another embodiment, the housing of the latch mechanism may also be a stackable body. In this embodiment, the housing may also include a step configured to be received by another latch mechanism.

BRIEF DESCRIPTION OF THE DRAWINGS

An embodiment of the invention will now be described by way of example with reference to the drawings in which.

DETAILED DESCRIPTION OF THE INVENTION

Figure 1:
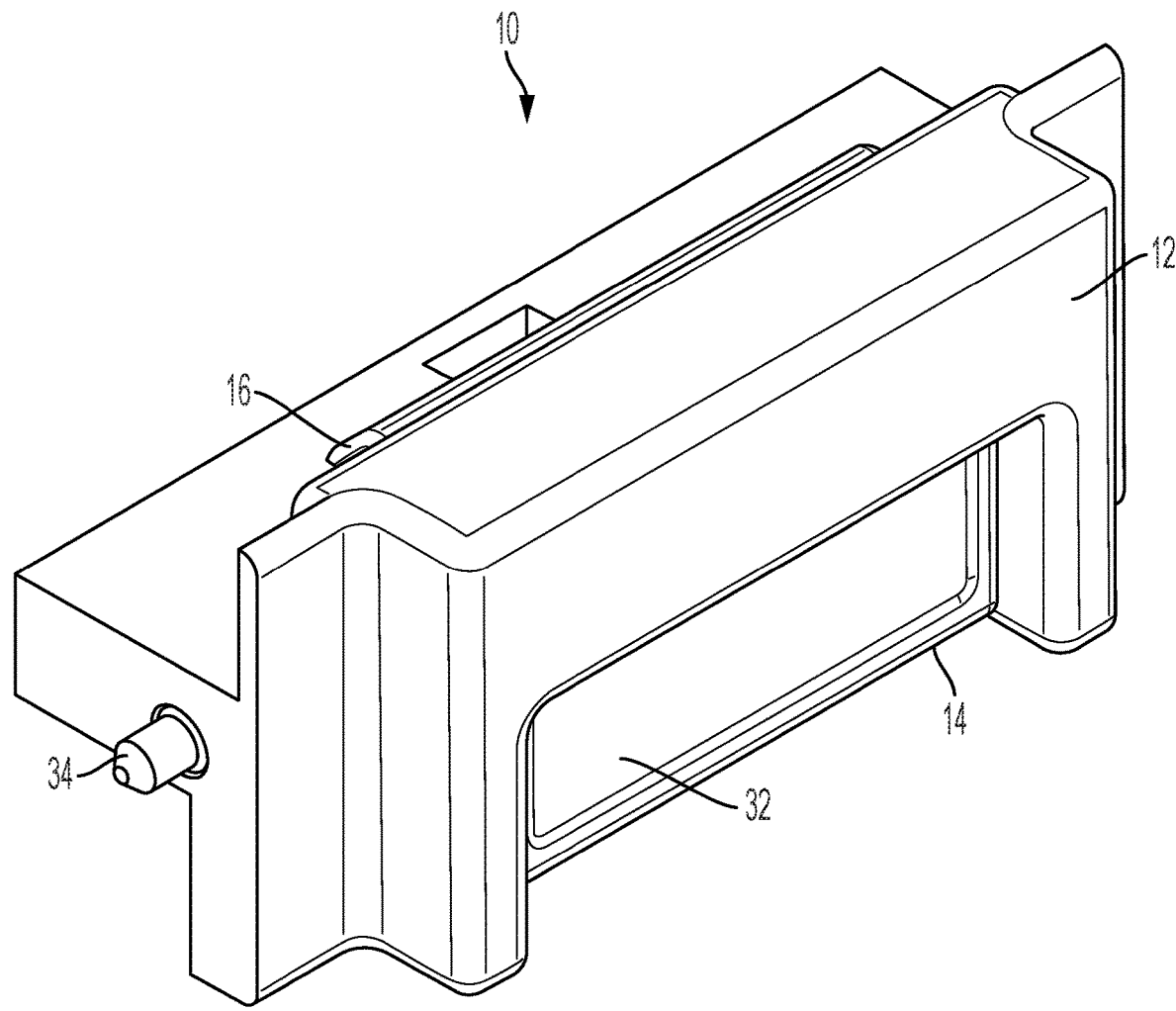
FIG. 1 is a perspective view of the front of a latch mechanism according a first embodiment of the invention.

FIG. 1 discloses an embodiment of a latch mechanism 10. Latch mechanism 10 includes a housing 12 and a latch 14. Latch 14, which may be partially disposed within the housing 12, includes a main body 15, a primary hook 16 and an opposing secondary hook 18. Latch 14 is rotatable within housing 12 between a first position and a second position. In the first position, the primary hook 16 is not obscured by the housing 12. In the second position, the primary hook is substantially obscured by the housing 12.

Latch mechanism 10 may also include one or more biases or springs 20. Bias 20, which is configured to bias the latch 14 toward its first position, may be disposed between an interior wall 22 of housing 12 and latch 14.

The primary hook 16 extends away from the main body 15 and includes a step receiving surface 24. Applying force to the step receiving surface 24 moves the latch 14 toward its second position. In a preferred embodiment, step receiving surface 24 may be angled. Primary hook 16 may further include a cantilevered surface 25. A primary tooth 26 may be positioned on the cantilevered surface 25 so as to extend downwardly and partially across the width of step receiving surface 24. Primary tooth 26 may be configured to engage a step 50 of a stackable body.

The secondary hook 18, which also extends from main body 15, may include a protruding arm 28. A secondary tooth 30 is positioned at the end of the protruding arm 28. Secondary tooth 30 extends upwardly from protruding arm 28 and has a length which is less than the length of primary tooth 26. Secondary tooth 30 is configured to engage a step 50 of a stackable body.

The main body 15 of latch 14 may also include an operator surface 32. The operator surface 32 is configured such that applying pressure thereto rotates the latch toward its second position. In a preferred embodiment, the operator surface 32 is positioned on the side of the main body 15 that is opposite the side from which the primary hook 16 and opposing secondary hook 18 extend.

Figure 3:
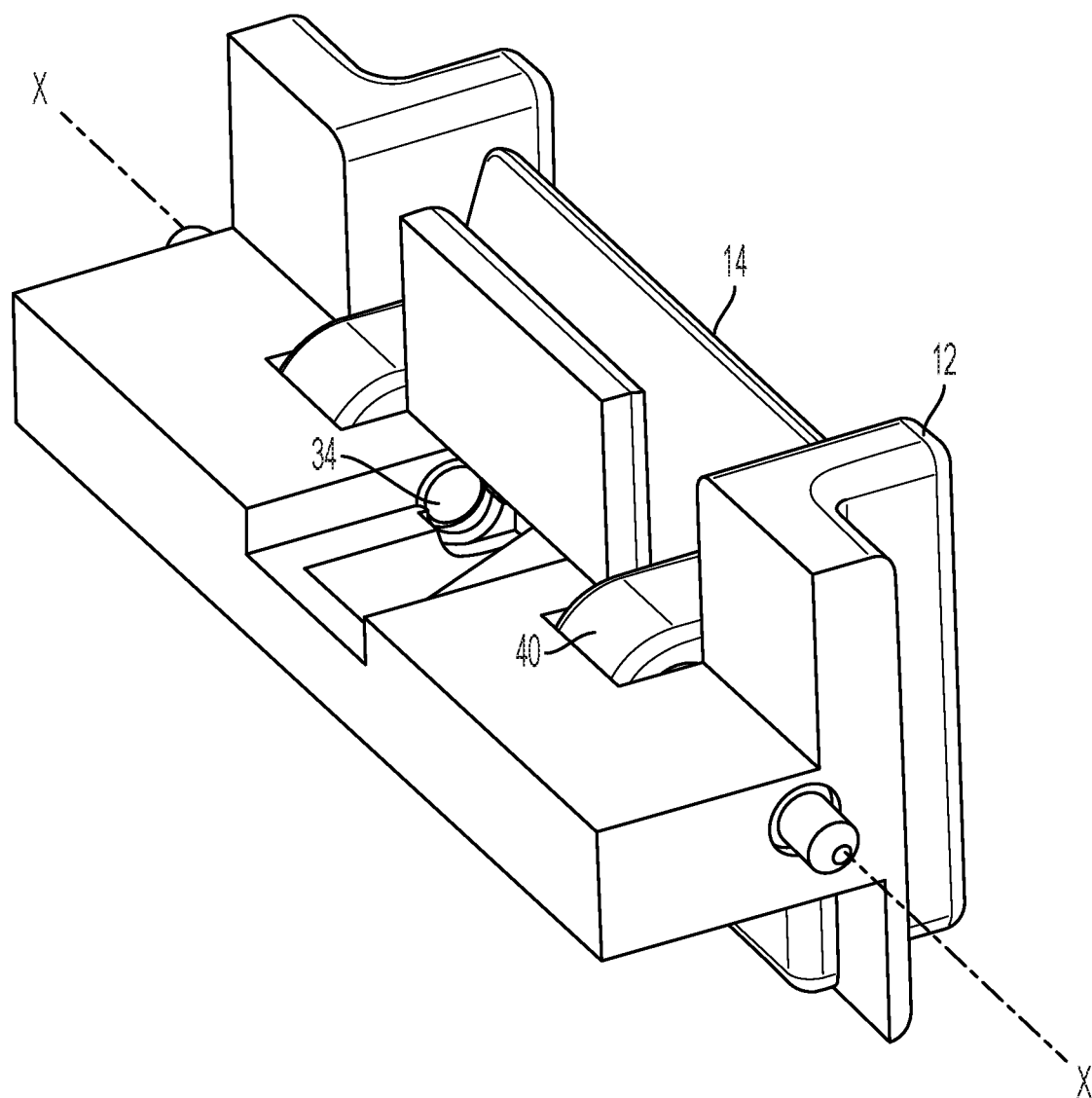
FIG. 3 is a perspective view of the bottom of latch mechanism according to the first embodiment of the invention.
Figure 4:
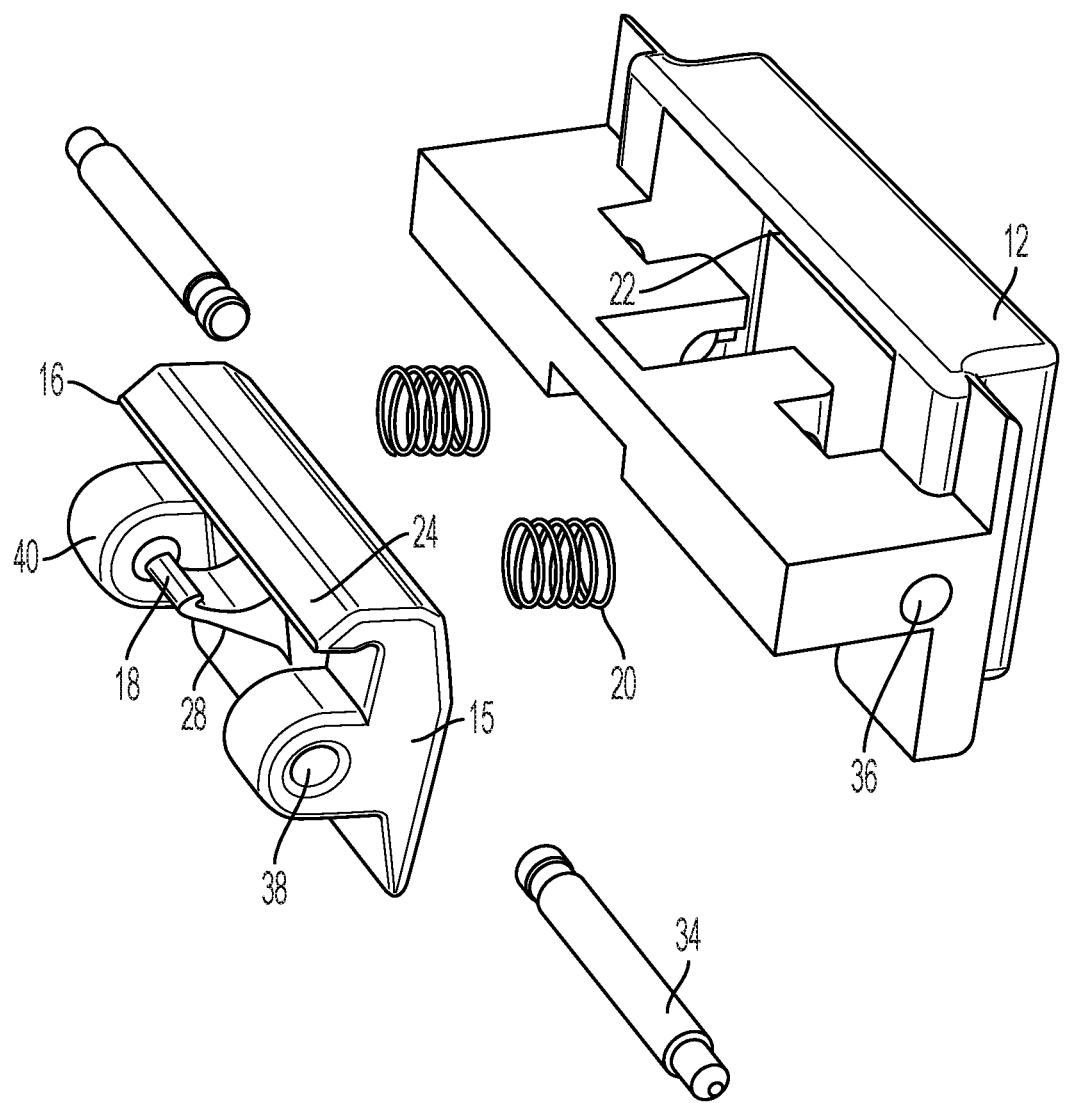
FIG. 4 is an exploded view of a latch mechanism according to the first embodiment of the invention.
Figure 5:
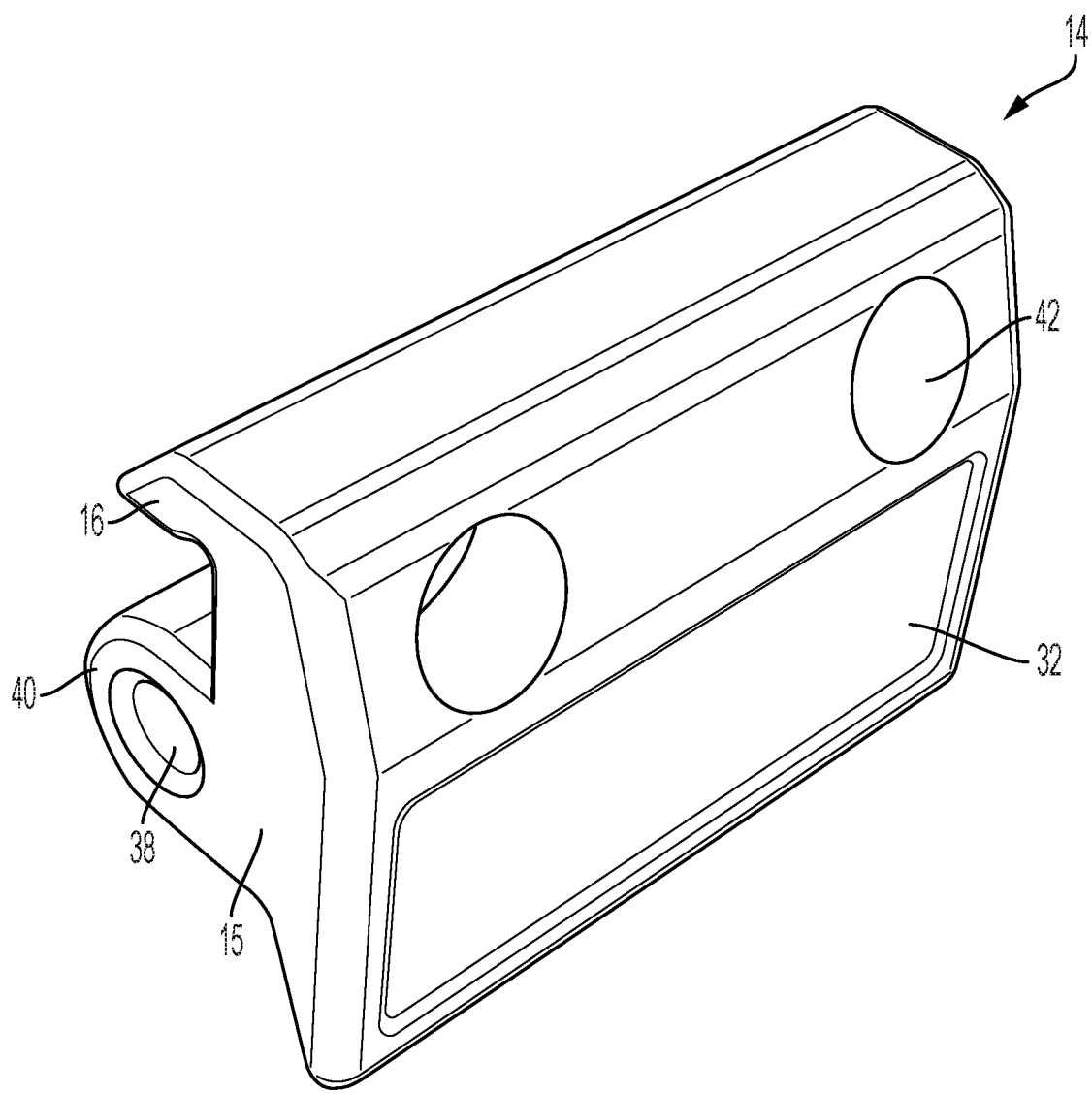
FIG. 5 is a perspective view of the front of a latch according to the invention.
Figure 6:
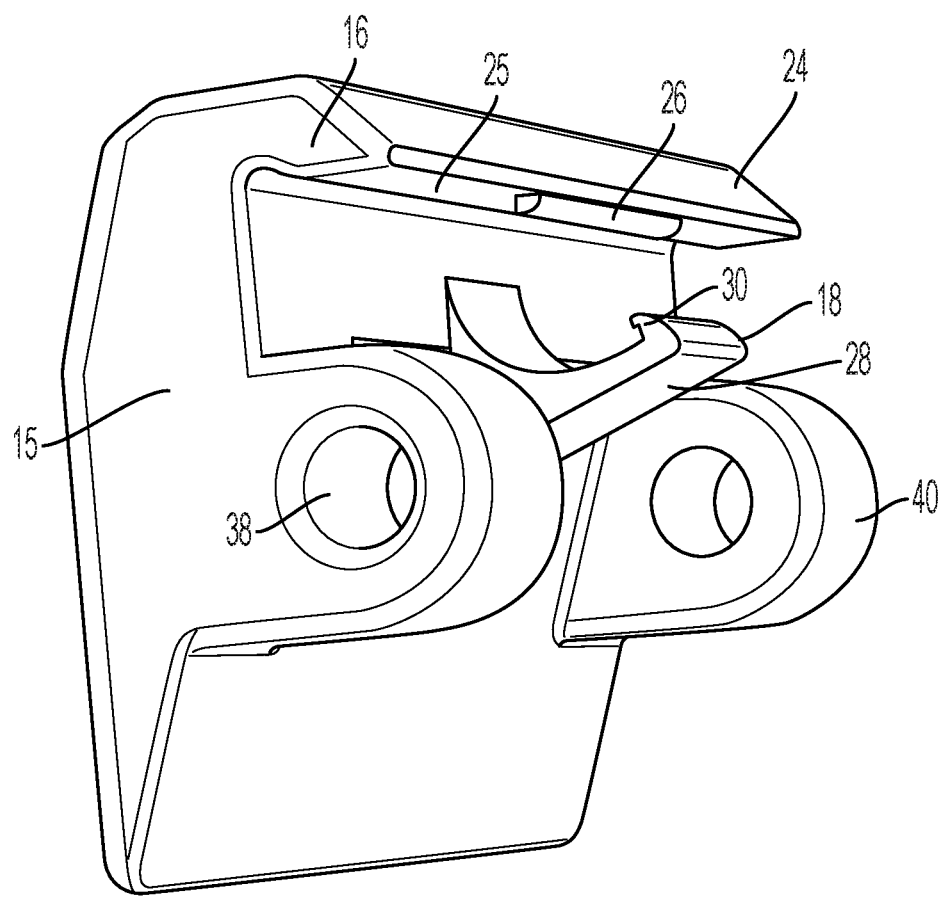
FIG. 6 is a perspective view of the rear of a latch according to the invention.

Rotational movement of the latch 14 within housing 12 may be achieved by a pin 34 simultaneously disposed in a circular through opening 36 defined in the housing 12 and an opening 38 defined in the latch 14. Those skilled in the art will recognize that the rotational movement can be improved with the use of multiple pins 34 and multiple openings 36, 38. As best seen in FIGS. 4 and 6, opening 38 may be defined in pin arms 40 that extend from the main body 15 of latch 14. In a preferred embodiment, pin arms 40 extend from the same side of the main body 15 as do primary hook 16 and secondary hook 18. As best seen in FIG. 3, when latch 14 is positioned within housing 12; pin 34, circular through opening 36 and opening 38 are all on the same axis X. One pin 34 extends through one housing opening 36 and corresponding latch opening 38. The laterally inward opening of through opening 36 includes a narrowed region against which pin 34 abuts. Alternatively, pins 34 may include channel regions and the inner ends of openings 36 may be formed with an inwardly extending collar region which may be forced into the channel regions to retain pins 34. In either case, the opposite lateral ends of pins 34 extend laterally outwardly of housing 12, and pins 34 have sufficient flexibility for slight lateral movement.

Latch 14 may also include one or depressions 42. Depressions, 42 are sized and configured to receive a bias or spring 20. When bias 20 is positioned within depression 42 and the interior wall 22 of housing 12, the entire latch 14 is biased toward its first position. In a preferred embodiment, there may be two depressions 42 and they may be positioned on the main body 15 on the same side as the operator surface 32.

Figure 2:
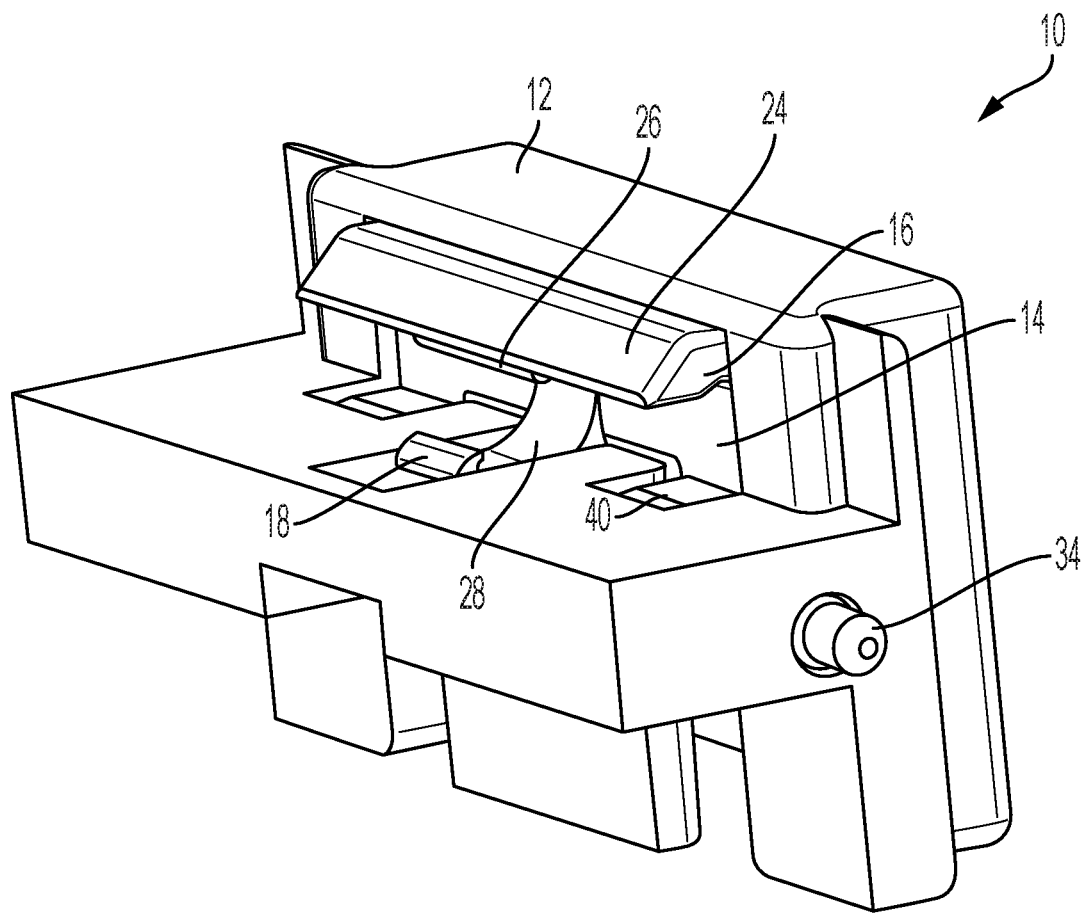
FIG. 2 is a perspective view of the rear of a latch mechanism according to the first embodiment of the invention.
Figure 12:
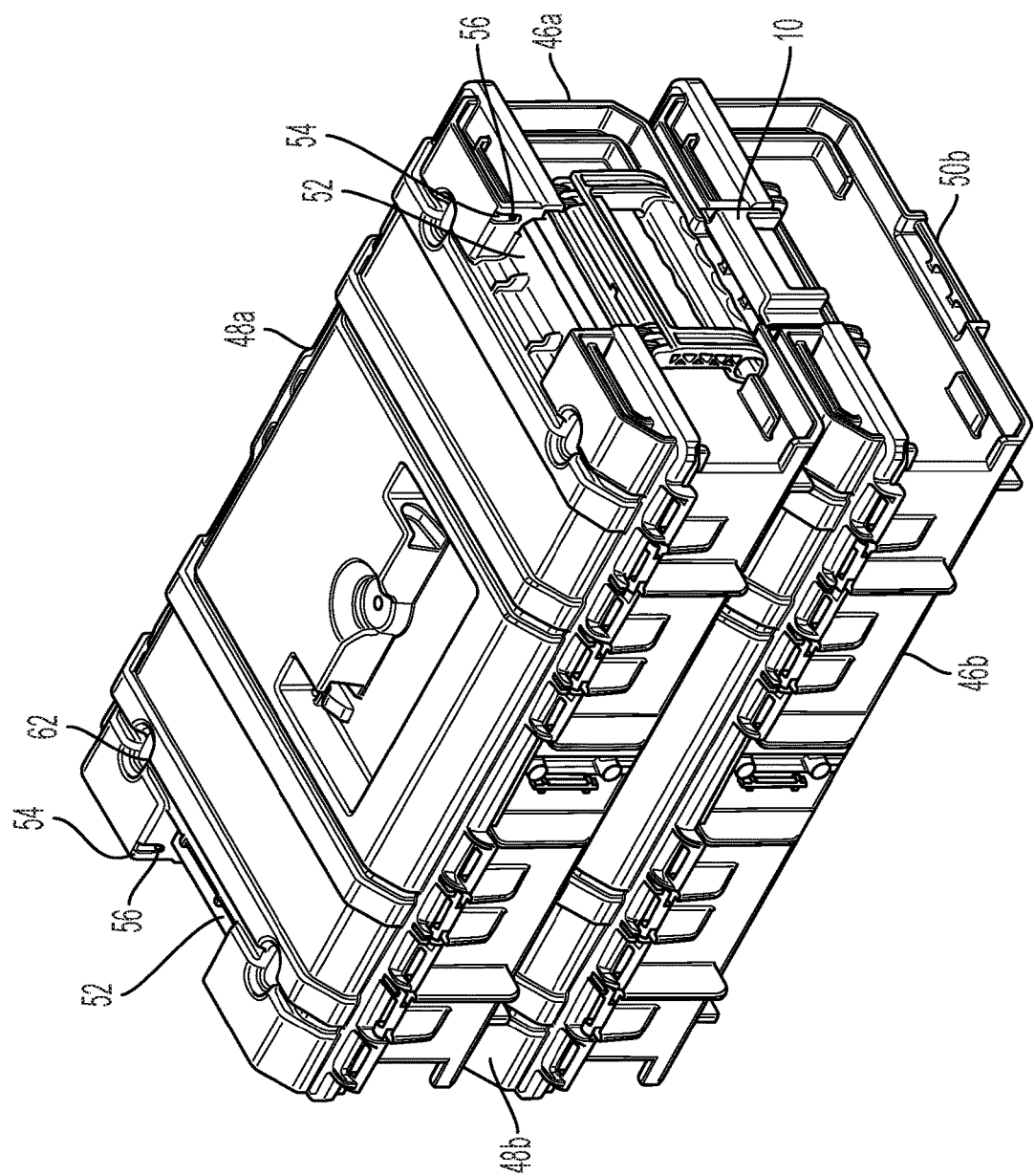
FIG. 12 is a perspective view of two containers being held together by a latch mechanism according to the first embodiment of the invention.

The latch mechanism 10 of the present invention may have a variety of different embodiments. FIGS. 1-3 show a first embodiment wherein the housing 12 is relatively compact. In this embodiment, the latch mechanism 10 may be used in conjunction with a container 44 such as that depicted in FIGS. 7 and 12. Container 44 may include a body 46 and a lid 48. Body 46 includes a step 50 that is configured to be selectively engaged and disengaged to a latch mechanism 10. Lid 48 contains one or more carveouts 52 that are configured to receive a latch mechanism 10 according to the first embodiment. As best seen in FIG. 12, carveout 52 may include one or more slots 54 and holes 56. In particular, slots 54 are formed in each side wall of carveout 52 near the laterally outermost edges thereof and extend downwardly from the top. Holes 56 are formed at the base of slots 54 and are formed as either regions of deeper indentations than the remainder of slots 54, or extend entirely through lid 48. Slots 54 and holes 56 are configured to receive pins 34. More specifically, slots 54 function as guides as latch mechanism 10 is positioned within carveout 52. Latch mechanism 10 is slid downwardly within carveout 52 with the laterally outward extending ends of pins 34 sliding in slots 54 until they reach holes 56. Pins 34 are slightly compressed inwardly while sliding in slots 54 and once latch mechanism 10 is pressed into a fully seated position, pins 34 are disposed in holes 56. When pins 34 are disposed within holes 56, the latch mechanism is secured within carveout 52.

Figure 7:
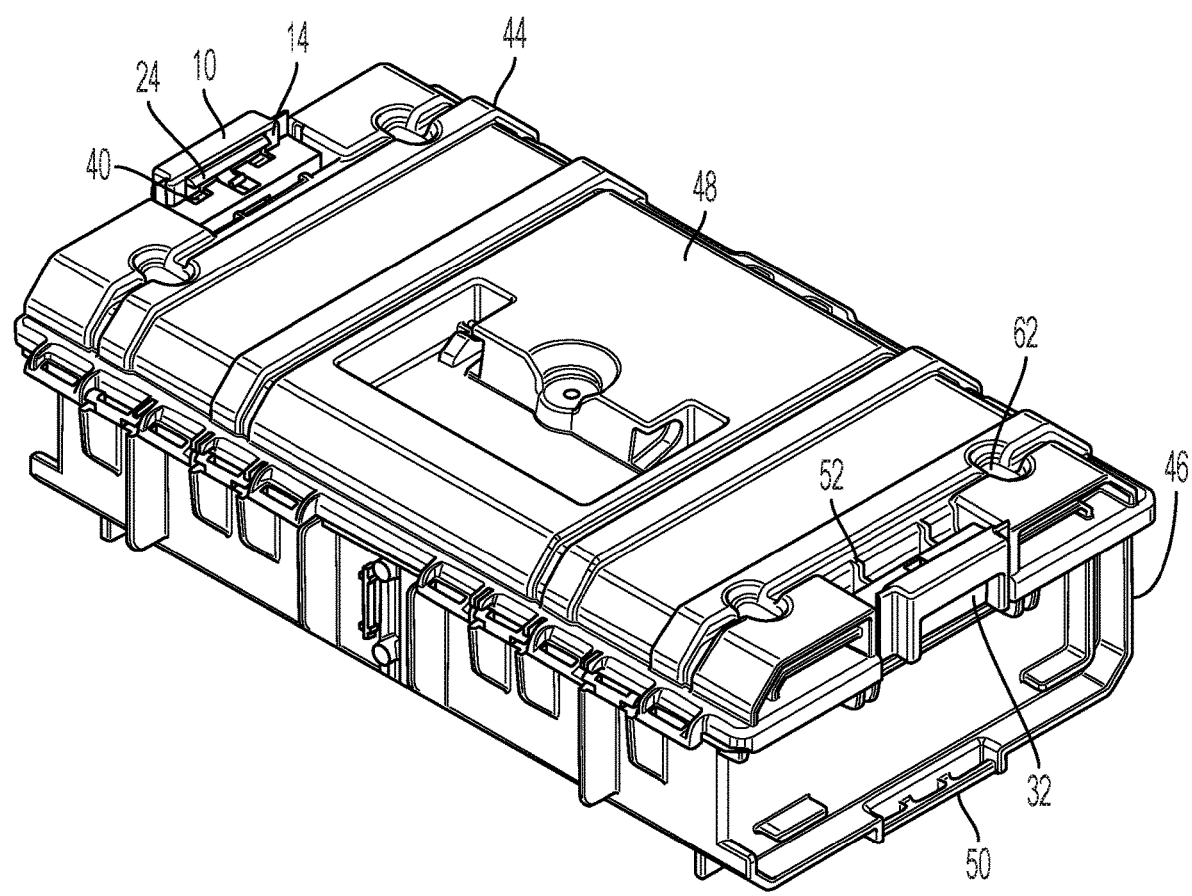
FIG. 7 is a perspective view of a container employing a latch mechanism according to the first embodiment of the invention.
Figure 9:
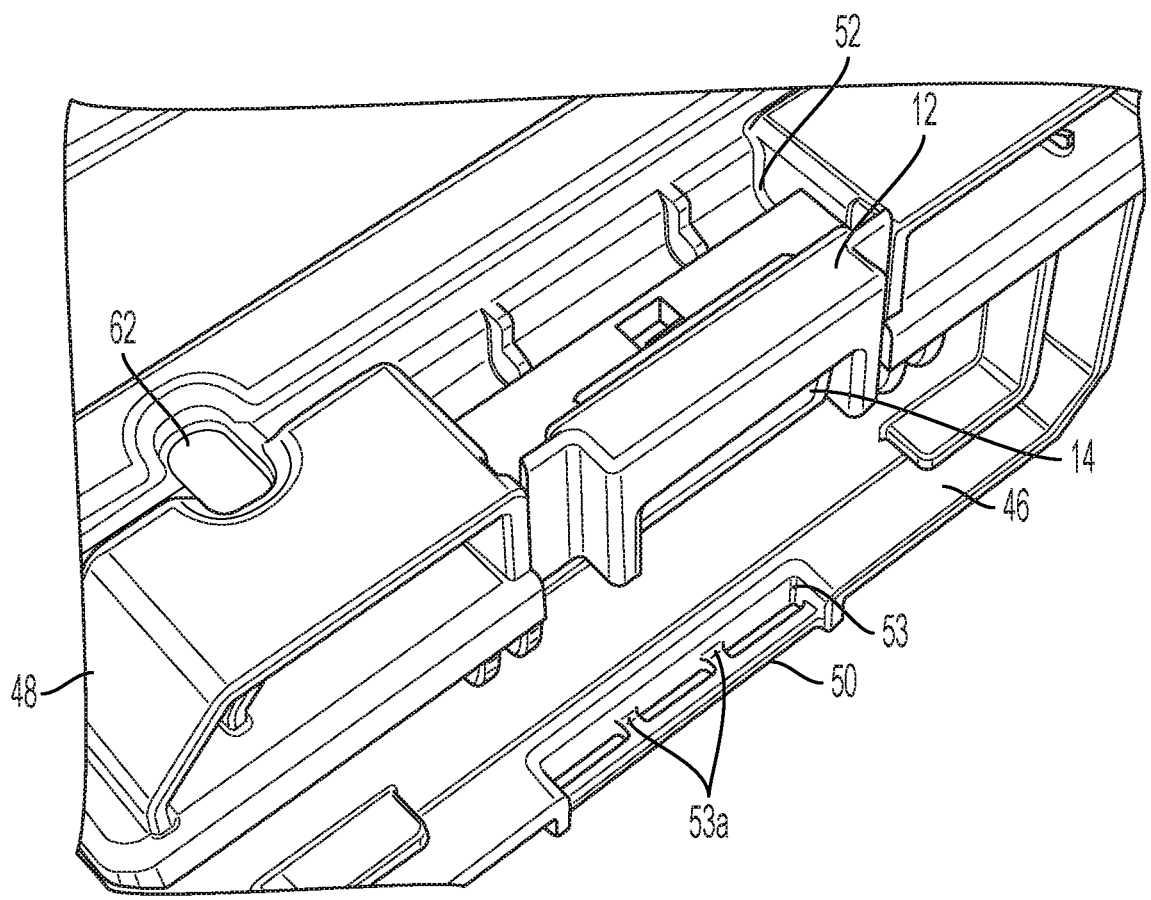
FIG. 9 is a detailed perspective view of a container employing a latch mechanism according to the first embodiment of the invention.
Figure 10:
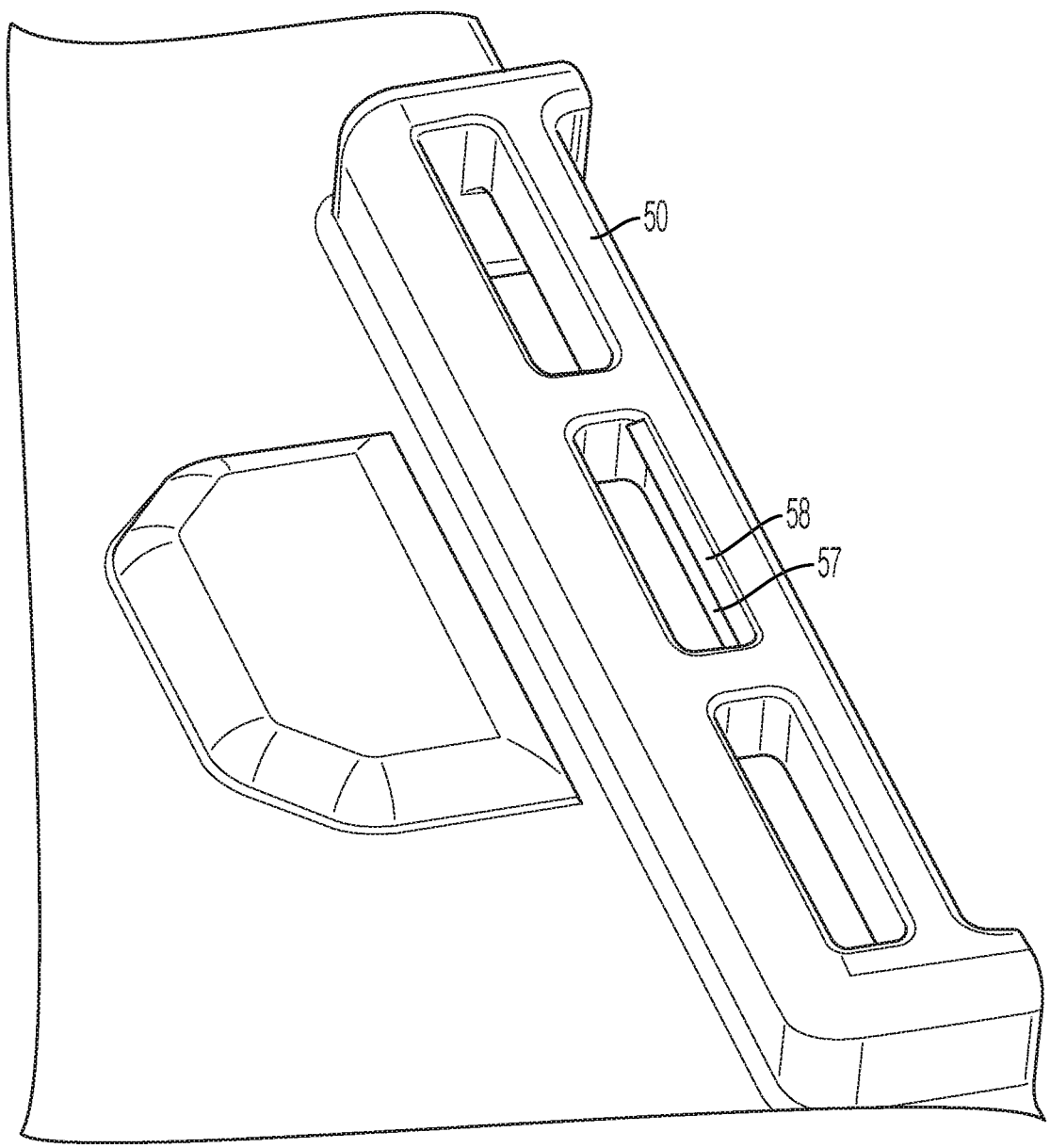
FIG. 10 is a detailed bottom perspective view of a step of a container.
Figure 11:
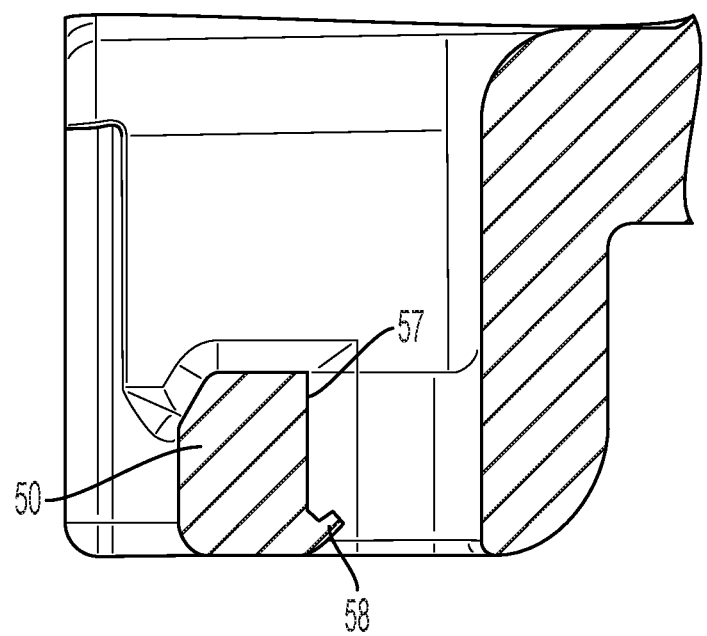
FIG. 11 is a cross sectional view of a step of a container.

Those skilled in the art will recognize that the primary function of latch mechanism 10 is to secure two bodies to one another. In order to perform this function, latch 12 is configured to selectively engage a step 50, such as that shown in FIG. 9. More specifically, the primary hook 16 and the secondary hook 18 are configured to separately engage step 50 at different locations thereof. Still further, the primary tooth 26 and the secondary tooth 30 are configured to engage step 50. Still further, the primary tooth 26 is configured to engage an upper portion 57 of step 50 and the secondary tooth 30 is configured to engage a lip 58 of step 50. With reference to FIGS. 7, 9 and 10, body 46 includes a rectangular cutout opening 53 formed on each lateral side near the bottom thereof. Body 46 includes step 50 which may have a substantially rectangular cross-sectional shape and which extends between opposite side surfaces of cutout openings 53. Step 50 may also be attached to the inner surface of cutout opening 53 via two connecting structures 53a to create three rectangular openings. Lip 58 is formed adjacent the lower surface of step 50 (at the top in the bottom view of FIG. 10) and extends across the middle rectangular opening. Lip 58 is located generally opposite upper portion 57.

Figure 16:
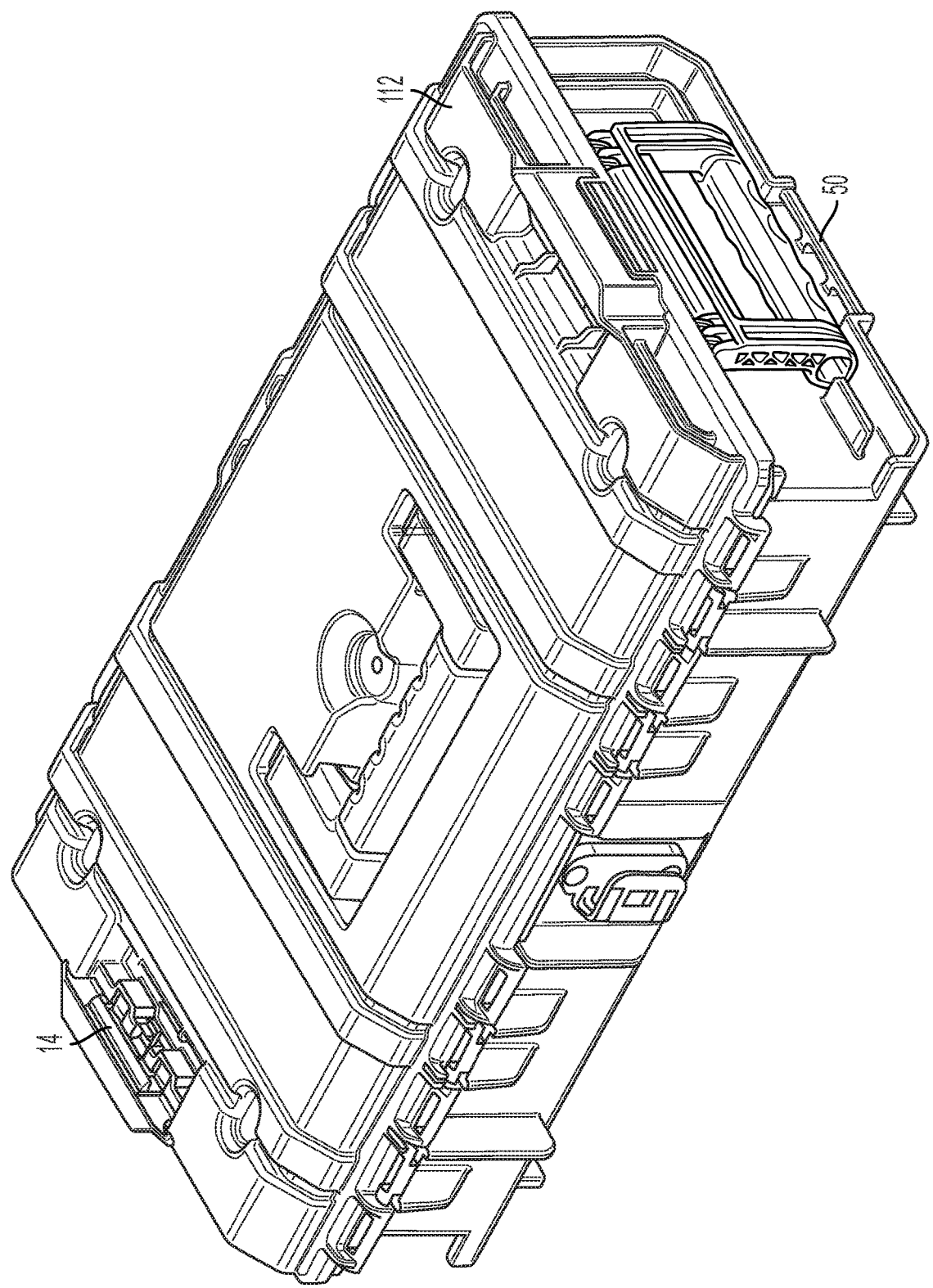
FIG. 16 is a perspective view of a latch mechanism according to a second embodiment of the invention.
Figure 17:
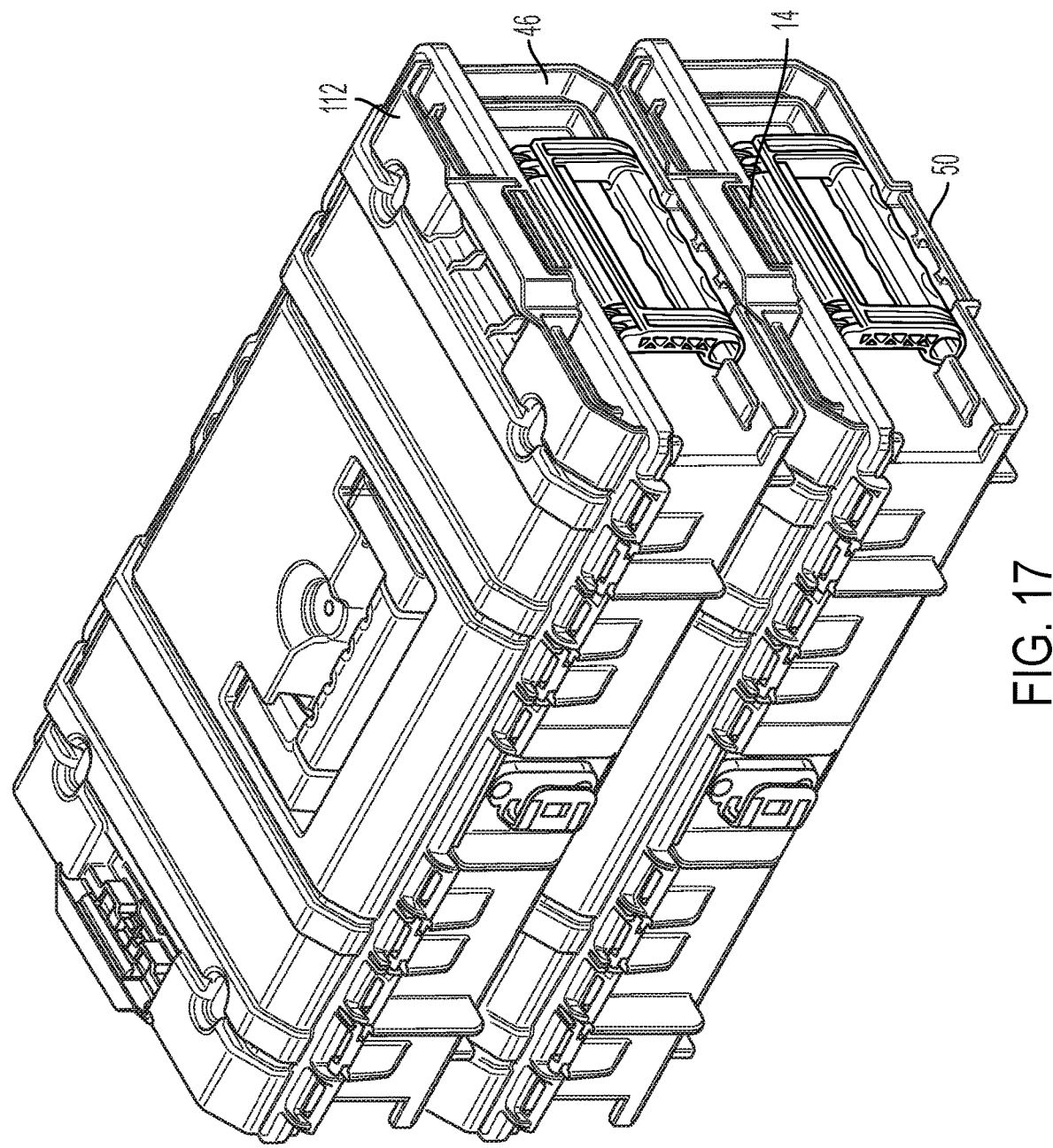
FIG. 17 is a perspective view of the latch mechanism according to the second embodiment securing two containers together.

FIG. 16 shows a second embodiment of the latch mechanism 110. This second embodiment 110 is different from the first embodiment 10 in that the housing 112 is not relatively compact. Instead, housing 112 is additionally configured to be a lid of a container. In this second embodiment, the latch 14 is identical to the latch in the first embodiment. Moreover, the latch 14 of the second embodiment also functions identically to that of the first embodiment. FIG. 17 shows the latch mechanism 110 of the second embodiment positively securing two containers together.

Figure 18:
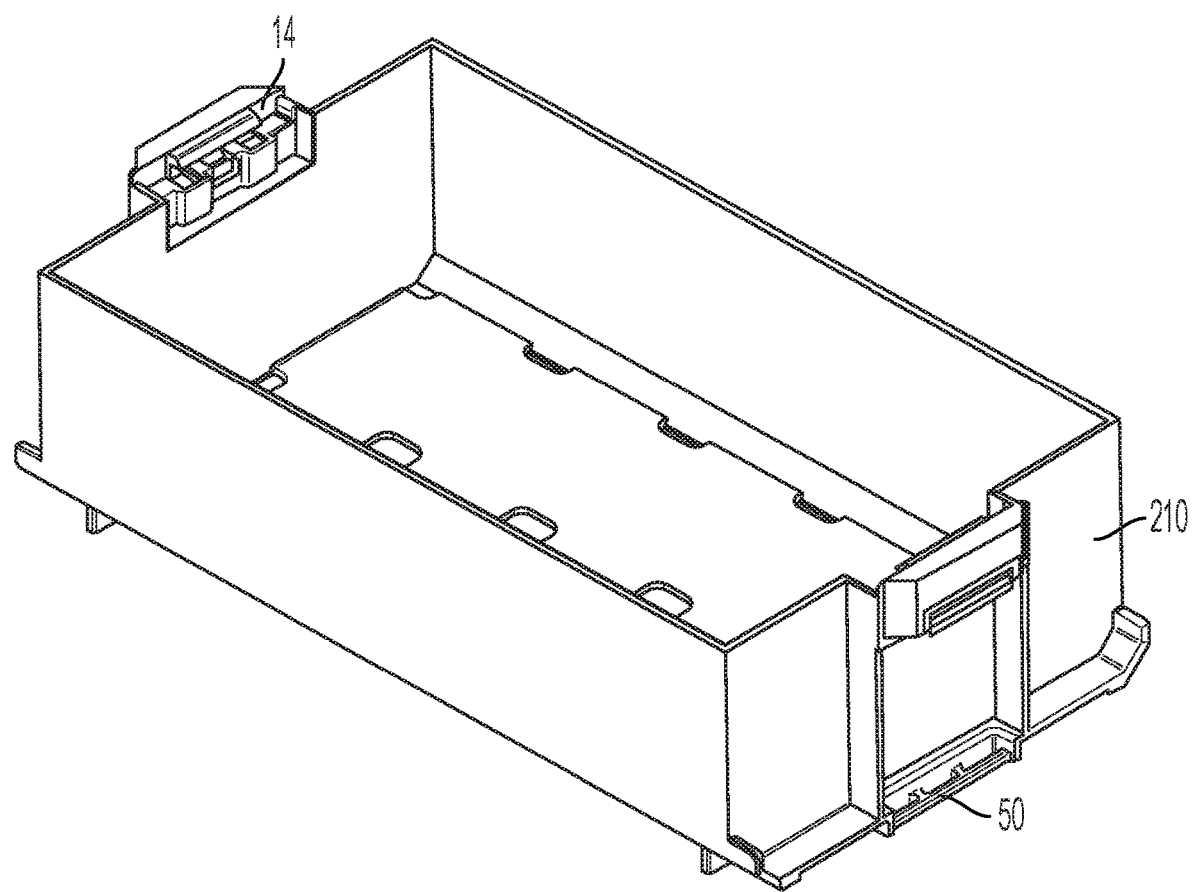
FIG. 18 is a perspective view of a latch mechanism according to a third embodiment of the invention.
Figure 19:
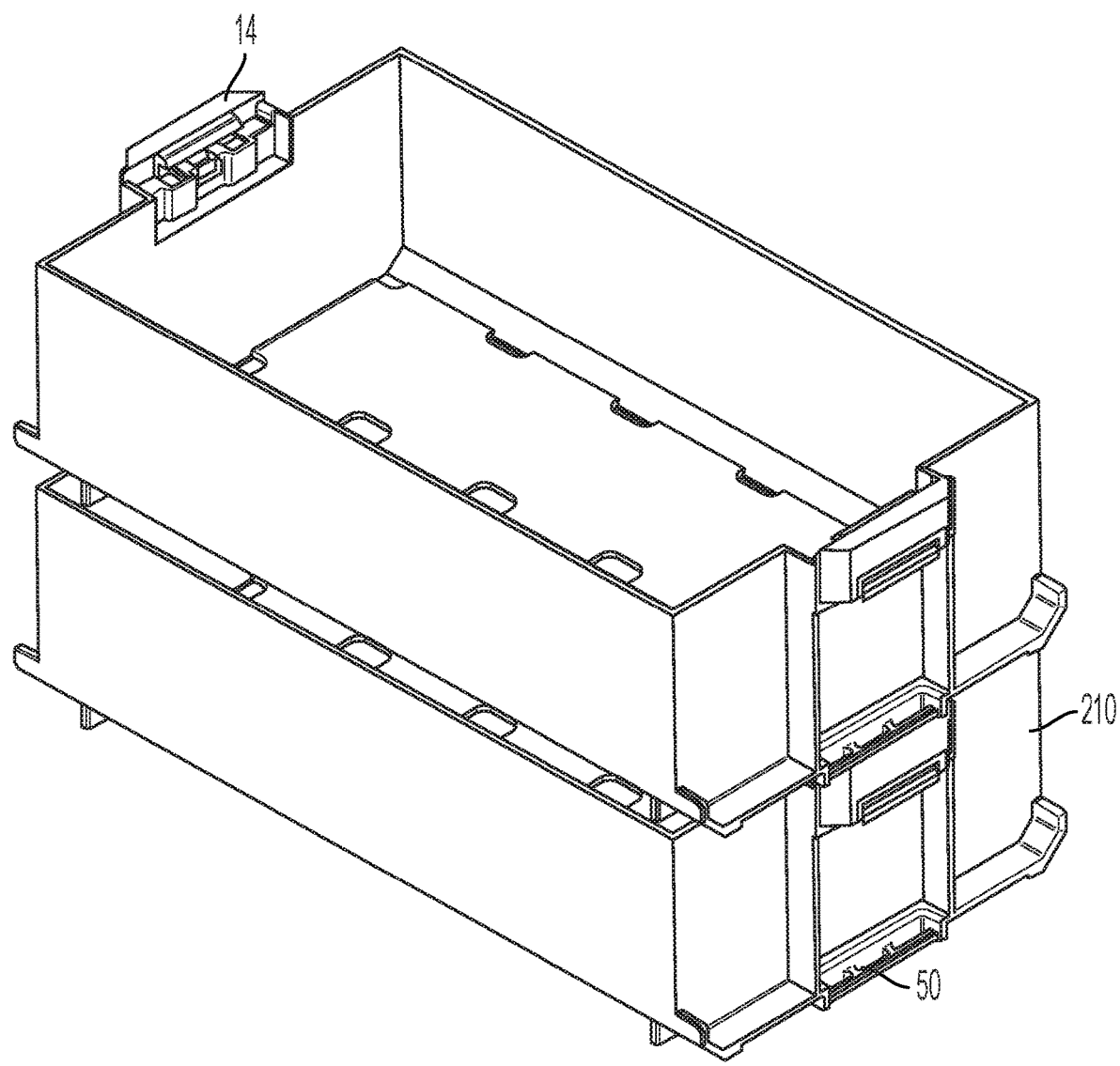
FIG. 19 is a perspective of two latch mechanisms according to the third embodiment secured together.

FIG. 18 shows yet a third embodiment from the latch mechanism 210. This third embodiment is different from the first embodiment 10 in that the housing 212 is additionally configured to be a stackable body. Housing 212 may also include a step 250 configured to be engaged by another latch mechanism. In this third embodiment, the latch 14 is identical to that of the first embodiment. Moreover, the latch 14 of the third embodiment also functions identically to that of the first embodiment. FIG. 19 shows the latch mechanism 210 of the third embodiment positively securing two stackable bodies together.

INDUSTRIAL APPLICABILITY

Turning now to FIGS. 12-15, the function of the latch mechanism 10 of the present invention positively coupling two bodies together will now be explained. FIG. 12 shows the latch mechanism 10 of the first embodiment coupling to containers together. For ease of reference, the top and bottom containers will be referred to using the identical reference numerals with the exception that the top container will include an "a", while the bottom container will include a "b".

Figure 13:
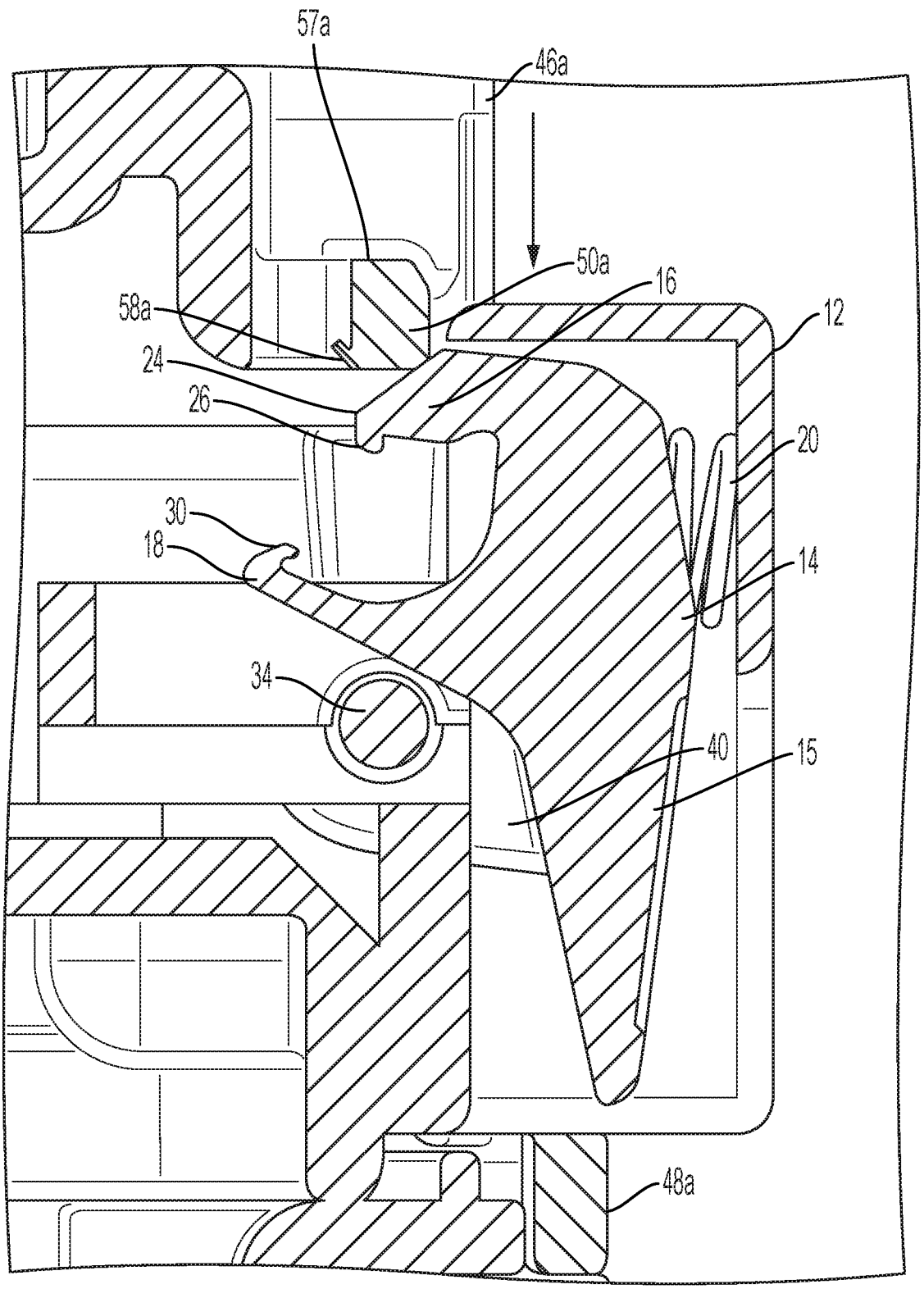
FIG. 13 is a cross sectional view of a latch receiving a step of a container.

Those skilled in the art will recognize that with the latch mechanism 10 of the first embodiment, body 46a will be coupled to lid 48b. As seen in FIG. 13, the first step is to position body 46a above lid 48b. Body 46a should be positioned such that step 50a is above the primary hook 16, and more specifically, above the step receiving surface 24. When properly positioned, body 46a can be pressed downward so that step 50a engages the step receiving surface 24. The application of downward force may also be achieved under the natural weight of body 46a. Step receiving surface 24 is angled so that when step 50a applies force thereto, latch 14 rotates against bias 20 toward its second position. Eventually, latch 14 rotates into its second position wherein the primary hook 16 is substantially obscured by the housing 12. When this occurs, latch 14 is displaced such that step 50a can move beneath the primary hook 16.

Figure 8:
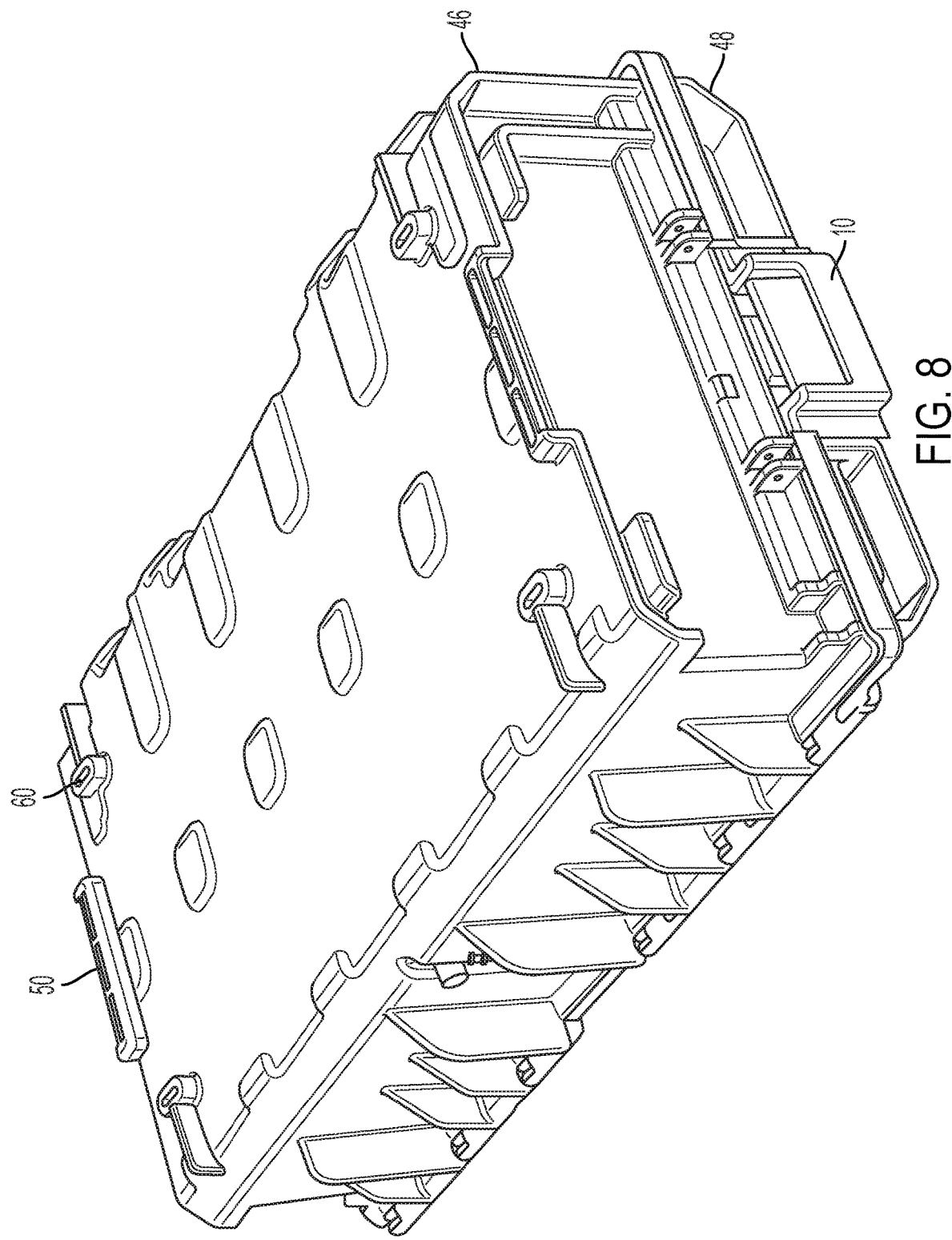
FIG. 8 is a bottom perspective view of a container employing a latch mechanism according to the first embodiment of the invention.
Figure 14:
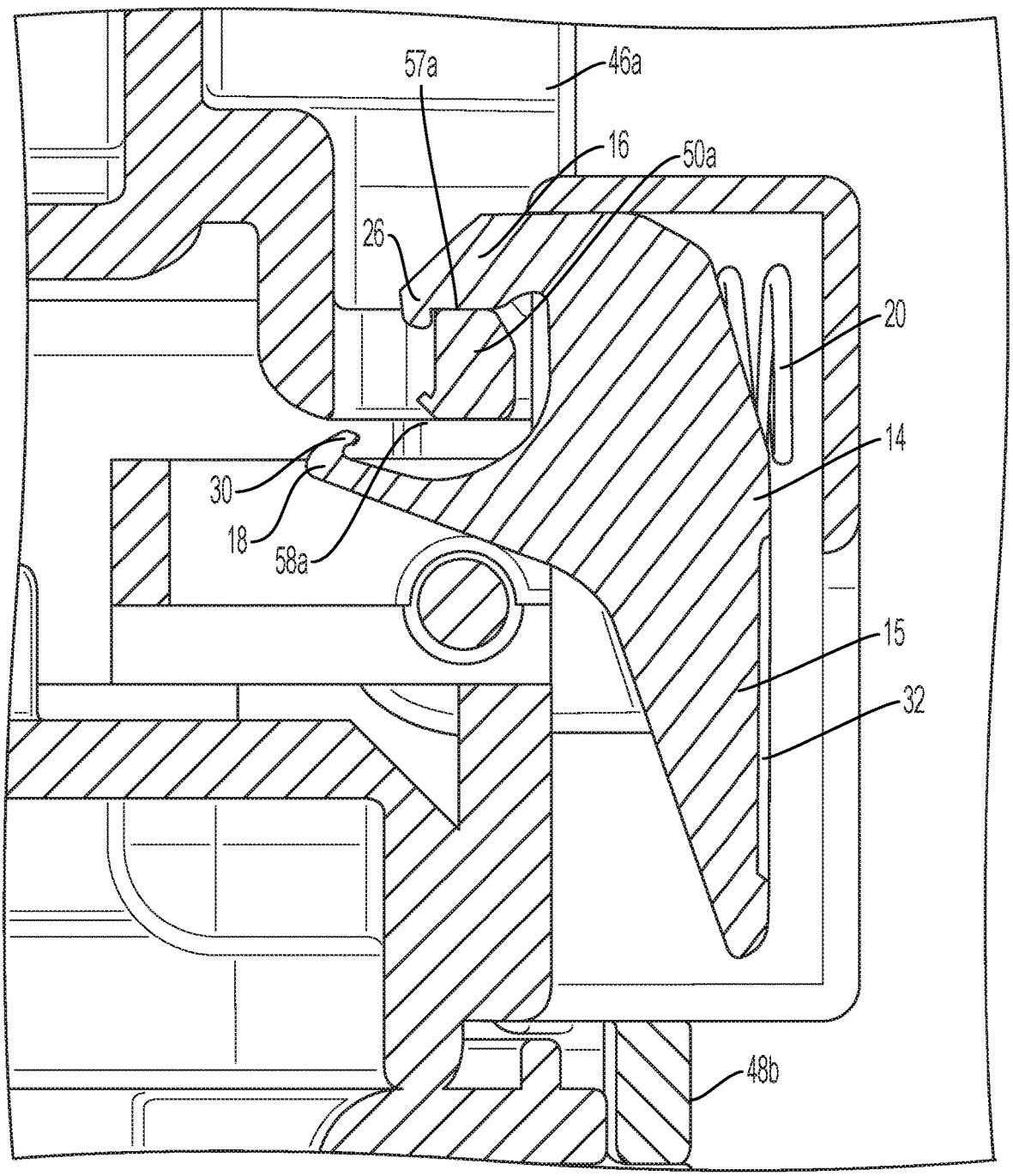
FIG. 14 is a cross sectional view of a latch in its first position.

As shown in FIG. 14, when step 50a is beneath primary hook 16, bias 20 automatically rotates latch 14 back to its first position. Primary hook 16 extends over upper portion 57a of step 50a with primary tooth 26 extending laterally inward of step 50a and generally into the middle rectangular opening. Any upward motion of body 46a will cause the primary hook 16 to engage the top surface of step 50a and therefore upward motion is precluded. And any inward lateral movement of body 46a relative to lid 48b is precluded by the engagement of primary tooth 26 on the side wall of upper portion 57a of step 50a. At this point, body 46a and lid 48b are positively coupled together by latch mechanism 10. (See FIG. 12.) Those skilled in the art will recognize that horizontal movement of body 46a will not free it from the latch mechanism 10 as such horizontal movement is limited by the primary tooth 26. Moreover, a second latch mechanism positioned on the other side of lid 48b may further limit horizontal movement of body 46a. Still further, as shown in FIG. 8, body 46 may include one or more feet 60. Feet 60 may be configured to be disposed into corresponding depressions 62, which may be found in lid 48.

Figure 15:
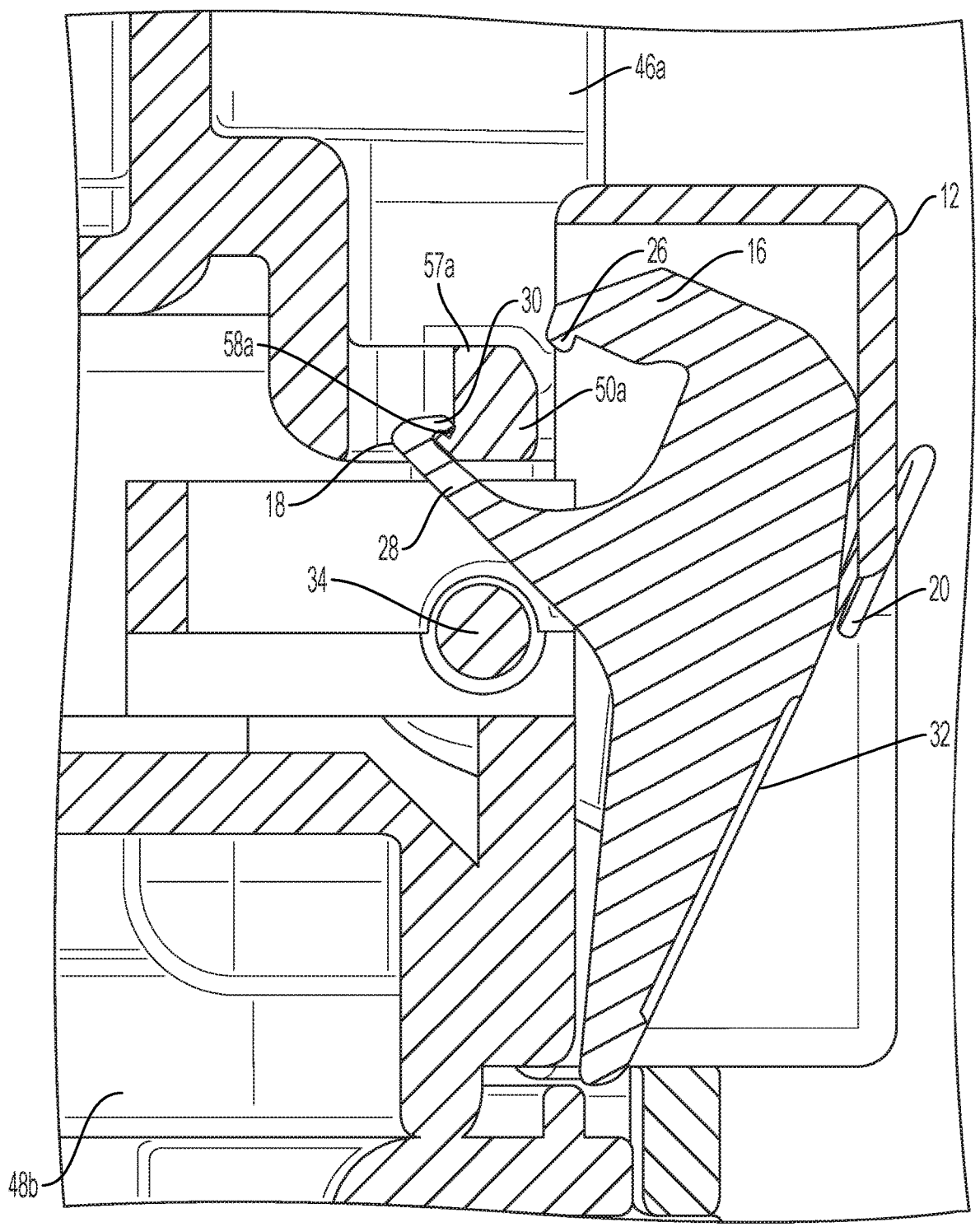
FIG. 15 is a cross sectional view of a latch in its second position.

When an operator wishes to release body 46a from lid 48b, she will apply pressure to the operator surface 32. In so doing, latch 14 is once again rotated against bias 20 into its second position. As step 50a is still positioned beneath primary hook 16, rotating latch 14 to its second position causes the secondary hook 18 to engage step 50a. More specifically, the secondary tooth 30 engages the lip 58a of step 50a. As seen in FIG. 15, the engagement of secondary tooth 30 to lip 58a is sufficient to positively hold latch 14 in its second position. However, since the length of secondary tooth 30 is small as compared to the overall length of step 50, the engagement of tooth 30 and lip 58a is insufficient to secure body 46a on lid 48b. Therefore, an operator may move body 46a upward to free it from lid 48b. In order to improve the ease in which the secondary tooth 30 may be disengaged from the lip 58a, the secondary hook 18 and/or the lip 58a may be flexible.

Those skilled in the art will recognize that the latch mechanisms of the second embodiment 110 and third embodiment 210 engage and disengage from a step 50 in the same way as that outlined for the first embodiment 10.

While the present invention has been described in connection with what is considered the most practical and preferred embodiments, it is understood that this invention is not limited to the disclosed embodiments but is intended to cover various arrangement included within the spirit and scope of the broadest interpretation of the attached claims so as to encompass all such modifications and equivalent arrangements.

The invention claimed is:

1. A container system including at least a first container and a second container, each container comprising:
   a carve out formed adjacent an upper surface of the container;
   a step formed adjacent a lower surface of the container, said step including an upper surface portion and a lower lip, said step having a length;
   a latch pivotally disposed in said carve out, said latch including a first hook having a first tooth having a length extending therefrom and a second hook having a second tooth having a length extending therefrom;
   wherein, said first said container is stackable on said second container with said latch of said second container disposed adjacent said step of said first container, and said latch is pivotable between a first position in which said first hook overlies said step of said first container and said first tooth extends along a side surface of said step of said first container to thereby secure said containers from moving relative to each other, and to a second position in which said first hook does not overlie said step of said first container and said second tooth engages said lower lip of said step of said first container to secure said latch in said second position.

2. The container system recited in claim 1, wherein, said length of said second tooth is less than the length of said step of said first container.

3. The container system recited in claim 1, wherein, said length of said second tooth is less than the length of said first tooth.

4. The container system recited in claim 1, wherein, said containers each comprise a container body and a lid disposed thereon, said carveout formed in said lid and said step formed on said container body.

5. The container system recited in claim 1, said latch slidably received in said carveout.

6. A container system including at least a first container and a second container, said first container stackable on said second container, said container system further comprising:
   a step formed on each container;
   a latch disposed on each container, said latch having a hook having a tooth extending therefrom, said latch having lateral sides and a pin extending outwardly of each of the lateral sides of said latch, said latch disposed on said container so that when said first container is stacked on said second container said latch of said second container is pivotable about said pin between a first position in which said hook of said second container overlies said step of said first container and said tooth extends along a side surface of said step of said first container to thereby secure said containers from moving relative to each other, and to a second position in which said hook of said second container does not overlie said step of said first container; and
   a spring biasing said latch towards said first position.

7. The container system recited in claim 6, said lateral sides of said latch including openings formed therethrough, said pin extending through said openings.

8. The container system recited in claim 7, said latch including a main body and said lateral sides of said latch comprising first and second pin arms extending from said main body, said openings comprising a first opening extending through said first pin arm and a second opening extending through said second pin arm.

9. The container system recited in claim 8 further comprising two said pins, a first pin of said two said pins extending through said first opening and a second pin of said two said pins extending through said second opening.

10. The container system recited in claim 9, said containers each comprising an upper side and a lower side, said step formed adjacent one of said upper side and said lower side, said containers further including a carveout formed therein adjacent the other of the upper side and the lower side, said latch disposed in said carveout of each container.

11. The container system recited in claim 10, said carveouts each including a first hole and a second hole formed therein, said first pin having an end disposed in said first hole and said second pin having an end disposed in said second hole.

12. The container system, recited in claim 10, said step formed adjacent said lower side and said carve out disposed adjacent said upper side.

13. The container system recited in claim 6, said containers each comprising an upper side and a lower side, said step formed adjacent one of said upper side and said lower side, said containers further including a carveout formed therein adjacent the other of the upper side and the lower side, said latch disposed in said carveout of each container.

14. The container system, recited in claim 13, said step formed adjacent said lower side and said carve out disposed adjacent said upper side.

15. A container system including at least a first container and a second container, said first container stackable on said second container, each of said containers including:
a body defining an interior storage region;
a cover movable between a position in which it encloses said interior storage region and a position in which it does not enclose said interior storage region;
a step formed on each container;
a latch disposed on each said container, said latch having a hook having a tooth extending therefrom, said latch having lateral sides and a pin extending outwardly of each of the lateral sides of said latch, said latch disposed on said container so that when said first container is stacked on said second container said latch of said second container is pivotable about said pin between a first position in which said hook of said second container overlies said step of said first container and said tooth extends along a side surface of said step of said first container to thereby secure said containers from moving relative to each other, and to a second position in which said hook of said second container does not overlie said step of said first container; and
a spring biasing said latch towards said first position.

16. The container system recited in claim 15, said cover comprising a lid attached to said body and pivotable between the position in which it encloses the interior storage region and the position in which it does not enclose the interior storage region.

17. The container system recited in claim 16, said latch disposed on said lid and said step disposed on said body.

18. The container system recited in claim 17, said lateral sides of said latch including openings formed therethrough, said pin extending through said openings.

19. The container system recited in claim 18, said latch including a main body and said lateral sides of said latch comprising first and second pin arms extending from said main body, said openings comprising a first opening extending through said first pin arm and a second opening extending through said second pin arm.

20. The container system recited in claim 19 further comprising two said pins, a first pin of said two said pins extending through said first opening and a second pin of said two said pins extending through said second opening.

\* \* \* \* \*